3,554,954
PROCESS FOR PREPARING COPOLYMER LATEXES
Constantine Rosis, West Boylston, and Milton Kline, Leominster, Mass., Jack Dickstein, Huntingdon Valley, Pa., and Harry C. Wechsler, Leominster, Mass., assignors to The Borden Company, New York, N.Y., a corporation of New Jersey
No Drawing. Filed Oct. 16, 1967, Ser. No. 675,283
Int. Cl. C08f 45/24, 15/24
U.S. Cl. 260—29.6    8 Claims

ABSTRACT OF THE DISCLOSURE

This invention relates to a process for preparing copolymer latexes wherein a monomeric vinyl halide and an acrylate ester are copolymerized. The acrylate ester and the vinyl halide are each added to the reaction vessel in a spaced manner and at predetermined intervals. Heat is supplied during reaction.

BACKGROUND OF THE INVENTION

Polyvinyl halide latexes are often used in formulating coating compositions. Heretofore, the latexes used suffered from several disadvantages, namely, the minimum temperature required to form a coating film from the coating composition was higher than desired and the coating produced often was distorted by its absorbence of colored light so that a clear or white coating exhibited a rainbow effect.

It is therefore an object of this invention to provide a process for preparing a polyvinyl halide latex composition which may be utilized in forming coating compositions at lower temperatures than is now feasible.

Another object of this invention is to provide a process for preparing a polyvinyl halide latex composition which will be free of the so called rainbow effect.

Other objects and advantages will become apparent from the following more complete description and claims.

SUMMARY OF THE DESCRIPTION

Broadly this invention contemplates a process for preparing a polymer latex comprising adding to a reactor, components comprising water, a catalyst, surfactant and buffer, heating said components to up to about 160° F., adding a vinyl halide monomer to said reactor at predetermined intervals, adding an acrylate ester to said reactor at predetermined intervals, heating said components, said monomer and said ester at a temperature of up to 160° F., and completing said reaction whereby a polyvinyl halide latex is produced capable of forming a film at a reduced temperature.

DETAILED DESCRIPTION

In practicing the process of this invention, water, surfactant or a combination of surfactants, catalyst and buffer are added to a reaction vessel and heated to assure a solution. During the heating, the aforesaid reactants are agitated. To this solution is then added a monomeric vinyl halide and an acrylate ester. The addition of the halide and acrylate ester is accomplished by adding them in portions and at spaced intervals. The second surfactant composition is also added at intervals during the reaction. After the addition of the vinyl halide monomer and acrylate ester and surfactants have been completed, the reaction continues, until the pressure within the reactor decreases and reaches a constant minimum value. Thereafter the pH of the latex is adjusted to that desired.

The vinyl halide monomer is added to the reactor in from about 20 to about 60 portions at time intervals of from about 10 to about 20 minutes. The amount of vinyl halide added may vary from about 20 to about 45 parts by weight based on 100 parts by weight of the total composition. However, it is preferred that the vinyl halide monomer be added in from 24 to 54 portions every 15 minutes. The preferred amount of vinyl halide monomer added is about 40 parts based on 100 parts of the total composition.

Among the vinyl halide monomers which may be used are vinyl chloride, vinylidene chloride, and the like.

The acrylate ester is added to the reactor in from about 4 to about 20 portions at intervals of from about 40 to about 65 minutes. It is preferred that the acrylate ester be added in from about 6 to about 14 portions every hour. The total amount of acrylate ester added may vary from about 7 to about 25 parts by weight based on 100 parts by weight of the total composition. The preferred amount of acrylate ester added is about 10 parts by weight based on 100 parts of the total composition.

The acrylate esters which may be used include; ethyl acrylate, methyl acrylate, propyl acrylate, butyl acrylate, octyl acrylate, decyl acrylate, stearyl acrylate and the like. Alkyl substituted acrylates are also very useful. It has been found that alkyl groups having up to about 16 carbon atoms may be substituted for a hydrogen atom on the alkyl portion of the acrylate ester. Among the alkyl substituted acrylates which may be used are 2-ethylhexyl acrylate, 2-hexyldecyl acrylate, 4-hexadecylstearyl acrylate, and the like.

The reaction itself is conducted at temperatures of from about 110° F. to about 160° F. at from about 80 to about 120 p.s.i.g. and for periods of time of from about 16 to about 24 hours. The time of the reaction will vary somewhat depending upon the reaction temperatures and pressure used. However, it is preferred to conduct the process at temperatures of between about 110° F. to 140° F. for about 18 to about 20 hours.

Among the materials which may be used to control the pH, are ammonium hydroxide, sodium hydroxide, potassium hydroxide, sodium phosphate, potassium phosphate, and the like.

The buffer is generally used in an amount of from about 0.1 to about 1.0 part by weight and preferably about 0.25 part based on 100 parts of the weight of the total composition.

A surfactant is preferably employed both initially as well as during the reaction to prevent the vinyl halide polymer latex from coagulating. The surfactant may initially be employed in an amount of from about 0.1 part to about 2.0 parts by weight based on 100 parts of the total composition. When surfactant is added during the reaction itself, it is preferably added in equal portions every hour. The total amount of surfactant added should not exceed 6 parts by weight based on 100 parts by weight of total composition, and it should be added from 12 to 20 portions at intervals of from about 40 to 65 minutes.

Among the surfactants which may be used are sodium lauryl sulfate, sodium alkyl aryl sulfonates such as sodium dodecyl benzene sulfonate, etc. a mixture comprising alkyl aryl sulfonate with other surfactants such as tetra-sodium N-(1,2-dicarboxy ethyl) N-octadecyl sulfosuccinamate, and the like. The pressure at which the reaction is conducted will also vary somewhat. Generally, the higher the temperature at which the reaction is conducted, the greater is the pressure.

A catalyst is used in an amount of from about 0.03 to about 0.3 part for 100 parts by weight of the total composition. It is preferred however, that a catalyst be used in an amount of from about 0.05 to about 0.07 part.

Among the catalysts which may be used are ammonium persulfate, potassium persulfate, sodium persulfate, water soluble catalysts such as urea peroxide, peracetic acid, succinic acid peroxide and the like.

After the reaction is completed, the pressure within the reactor is allowed to decrease to a minimum constant value, usually between about 5 p.s.i. to about 25 p.s.i., and the pH of the latex is then adjusted to between about 8.5 and 10.0 using any suitable base such as ammonium hydroxide.

If desired, a buffer may be present during the reaction to keep the pH from falling below 2. If the pH falls below 2, then there is the possibility that the reaction mass may be coagulated and the desired latex will not be obtained.

In order to more fully illustrate the nature of this invention and the manner of practising the same, the following examples are presented.

EXAMPLE I

The following components are charged to a glass lined reactor having an agitator with a speed of 75 r.p.m.

Part 1

| Components: | Parts by wt. |
|---|---|
| Deionized water | 50 |
| Dodecyl benzene sodium sulfonate | 0.4 |
| Dodecyl sodium sulfate | 1.2 |
| Ammonium persulfate | 0.20 |
| Ammonium dibasic phosphate | 0.50 |

The above components are heated to a temperature of 126° F. with agitation and maintained at that temperature through the reaction.

Part 2

| Components: | Parts by wt. |
|---|---|
| Monomeric vinyl chloride | 14.4 |
| 2-ethyl hexyl acrylate | 1.6 |
| Dodecyl benzene sodium sulfonate | 0.4 |
| Dodecyl sodium sulfate | 0.4 |

The monomeric vinyl chloride and 2-ethyl hexyl acrylate are added as follows:

The vinyl chloride is added in 24 equal portions every 15 minutes. The 2-ethyl hexyl acrylate is added separately from the vinyl chloride and in 6 equal portions over a period of 6 hours commencing one hour after the first addition of vinyl chloride. The dedocyl benzene sodium sulfonate and dodecyl sodium sulfate mixture is added in equal portions every hour during part 2 and during part 3, to be subsequently described.

Part 3

| Components: | Parts by wt. |
|---|---|
| Monomeric vinyl chloride | 16.8 |
| 2-ethyl hexyl acrylate | 7.2 |

The reaction is continued and monomeric vinyl chloride is added in 32 equal portions every 15 minutes. The 2-ethyl hexyl acrylate is added in 8 equal portions every hour. The addition of the dodecyl benzene sodium sulfonate and the dodecyl sodium sulfate described in part 2 is continued through part 3 in the same manner as in part 2.

After all additions are completed, the reaction continues until the pressure within the reactor decreases to a minimum constant value.

The pH of the resultant latex is then adjusted to between about 8.5 to 9.5 using 26% ammonium hydroxide. Thereafter, the latex emulsion is screened through a 125 mesh screen to remove any grits that may have formed.

The resultant latex emulsion is combined with other materials to form a coating composition, which has a minimum film forming temperature of 37° C., which is 10° C. lower than could be expected. Additionally, the film formed is free from the "rainbow effect."

EXAMPLE II

The procedure of Example I is repeated except as follows. In part 2, 15.2 parts by weight of monomeric vinyl chloride is used and 0.8 part by weight of ethyl acrylate (in place of the 2-ethyl hexyl acrylate) is used.

In part 3, 12.8 parts of monomeric vinyl chloride is used and 11.2 parts of ethyl acrylate is used.

An excellent product is obtained which has a minimum film forming temperature lower than could be expected and the film is free from the "rainbow effect."

EXAMPLE III

The procedure of Example I is repeated except that the acrylate ester used is monomeric methyl acrylate.

In part 2, the monomeric vinyl chloride is used in the amount of 14.4 parts and 1.6 parts of methyl acrylate is used.

In part 3, the monomeric vinyl chloride is used in the amount of 9.6 parts and 14.4 parts of methyl acrylate is used.

An excellent product is obtained which has a minimum film forming temperature lower than could be expected and the film formed is free of the "rainbow effect."

EXAMPLE IV

The procedure of Example I is prepeated several times. Each time, an acrylate ester is used which differs from the acrylate ester used in Example I. The acrylate esters used in this example are stearyl acrylate and 2-hexyldecyl acrylate.

In each instance, an excellent product is obtained which has a minimum film forming temperature lower than could be expected and the film is free from the "rainbow effect."

EXAMPLE V

The procedure of Example I is repeated except that the temperature used is 160° F.

An excellent product is obtained which has a minimum film forming temperature lower than could be expected and the film formed is free of the "rainbow effect."

EXAMPLE VI

The procedure of Example I is repeated except that the monomeric vinyl chloride is added in 27 portions. In part 2, monomeric vinyl chloride is added in 12 portions and in part 3, the monomeric vinyl chloride is added in 15 portions.

An excellent product is obtained which has a minimum film forming temperature lower than could be expected and the resultant film is free of the "rainbow effect."

EXAMPLE VII

The procedure of Example I is repeated except that 45 parts of monomeric vinyl chloride is used. In part 2, 21 parts is used and in part 3, 24 parts is used.

An excellent product having the desired properties is obtained.

EXAMPLE VIII

The procedure of Example I is repeated except that 20 parts of monomeric vinyl chloride is used. In part 2, 9.2 parts is used and in part 3, 10.8 parts is used.

An excellent product having the desired properties is obtained.

EXAMPLE IX

The procedure of Example I is repeated twice. The first time, the acrylate ester is added in 10 portions (part 2, 3 portions and part 3, 7 portions) and the second time the ester is added in 20 portions (part 2, 8 portions and part 3, 12 portions.)

An excellent product having the desired properties is obtained.

EXAMPLE X

The procedure of Example I is repeated except that 25 parts of 2-ethyl hexyl acrylate is used. The 2-ethyl hexyl acrylate is added as follows: part 2, 4.5 parts; part 3, 20.5 parts.

An excellent product having the desired properties is obtained.

EXAMPLE XI

This example forms no part of this invention. For purposes of comparison, this example demonstrates the effect on the product of adding the acrylate ester in one portion.

Part 1 of Example I is repeated.

Part 2

| Components: | Parts by wt. |
|---|---|
| Monomeric vinyl chloride | 31.2 |
| 2-ethyl hexyl acrylate | 8.9 |
| Dodecyl benzene sodium sulfonate | 0.4 |
| Dodecyl sodium sulfate | 0.4 |

The vinyl chloride is added in 56 equal portions every 15 minutes. The 2-ethyl hexyl acrylate is added separately from the vinyl chloride and in one portion, and one hour after the first addition of vinyl chloride. The dodecyl benzene sodium sulfonate and the dodecyl sodium sulfate is added in equal portions every hour.

After all additions are completed, the reaction continues until the pressure decreases to a minimum constant value.

The procedure of Example I is then followed.

The minimum film forming temperature of this latex is 47° C. The film exhibited a "rainbow effect."

While this invention has been described in terms of specific embodiments and illustrated by way of specific examples, the invention is not to be construed as limited except as set forth in the following claims.

We claim:

1. A process for preparing a polymer latex comprising adding to a reactor components comprising water, catalyst and surfactant; heating said components to assure solution of the components; adding vinyl halide monomer to said reactor in a total amount of from about 20 to 45 parts by weight based on 100 parts by weight of the total composition, said vinyl halide monomer being added from about 20 to 60 portions at time intervals of from about 10 to 20 minutes; adding prior to addition of the total amount of vinyl halide from about 7 to 25 parts by weight of an acrylate ester based on 100 parts by weight of the total composition, said acrylate ester being added from about 4 to 20 portions at intervals of from about 40 to 65 minutes; heating and maintaining the temperature of said components, vinyl halide monomer and acrylate ester at about 100° F. to 160° F., and continuing the reaction until the pressure drops to a constant minimum value.

2. Process of claim 1 wherein amount of said surfactant is in the range of 0.1 to 2.0 parts by weight, and amount of said catalyst being from 0.03 to 0.3 part by weight, based on 100 parts by weight of total composition.

3. Process of claim 2 including sufficient amount of a buffer to maintain said components, said vinyl halide monomer and said acrylate ester at a pH of 2 or above.

4. Process of claim 2 including the steps of agitating contents of the reactor, and adding additional surfactant from about 12 to 20 portions at intervals from about 40 to 65 minutes whereby the total amount of said surfactant is up to 6 parts by weight based on 100 parts by weight of total composition.

5. Process of claim 2 wherein said vinyl halide monomer is vinyl chloride, said acrylate ester is 2-ethyl hexyl acrylate, and said catalyst is ammonium persulfate.

6. Process of claim 3 wherein said buffer is dibasic ammonium phosphate which is added in an amount of from 0.1 to 1.0 part by weight based on 100 parts by weight of total composition.

7. Process of claim 1 including the step of adjusting the pH of the prepared latex to between 8.5 and 10.0.

8. Process of claim 1 wherein the first addition of said acrylate ester is made about one hour following the initial addition of said vinyl halide monomer.

References Cited

UNITED STATES PATENTS

| 2,520,959 | 9/1950 | Powers | 260—29.6EMX |
| 3,230,206 | 1/1966 | Albert et al. | 260—86.3 |

MURRAY TILLMAN, Primary Examiner

H. ROBERTS, Assistant Examiner

U.S. Cl. X.R.

117—161; 200—86.3